United States Patent [19]

Berchem et al.

[11] Patent Number: 4,804,207
[45] Date of Patent: Feb. 14, 1989

[54] CONNECTOR PIPE SEGMENT

[75] Inventors: Rütger Berchem, Gelsenkirchen; Georg Prokscha, Recklinghausen, both of Fed. Rep. of Germany

[73] Assignees: Metallpraecis Berchem; Schaberg Gesellschaft fur Metallformgebung M.B.H., both of Gelsenkirchen, Fed. Rep. of Germany

[21] Appl. No.: 145,832

[22] Filed: Jan. 20, 1988

[30] Foreign Application Priority Data

Jan. 24, 1987 [DE] Fed. Rep. of Germany ....... 3702062

[51] Int. Cl.$^4$ ............................................. F16L 55/18
[52] U.S. Cl. ....................................... 285/16; 285/55; 285/363
[58] Field of Search ...................... 285/15, 16, 17, 55, 285/363

[56] References Cited

U.S. PATENT DOCUMENTS 3,711,132  1/1973  Nickerson ...................... 285/422 X
4,653,777  3/1987  Kawatsu ............................. 285/16
4,684,155  8/1987  Doris .................................. 285/16

FOREIGN PATENT DOCUMENTS 508963  10/1930  Fed. Rep. of Germany ........ 285/16

Primary Examiner—Dave W. Arola
Attorney, Agent, or Firm—Herbert Dubno

[57] ABSTRACT

The connector pipe segment for conductor pipes or conduits for gaseous as well as fluid flow media comprises a pressure-tight outer shell, at least two connector pieces, a plurality of sealing surfaces and a wear-resistant sleeve, advantageously of a sintered ceramic material. The wear-resistant sleeve is inserted in the outer shell and the sealing surfaces are located on the outer shell. The wear-resistant sleeve is inserted with radial play and with axial play free of force in the outer shell so that a gap is formed between the outer shell and the wear-resistant sleeve. The gap is connected with the open cross section of the wear-resistant sleeve and admits the flow media.

4 Claims, 1 Drawing Sheet

U.S. Patent   Feb. 14, 1989   4,804,207
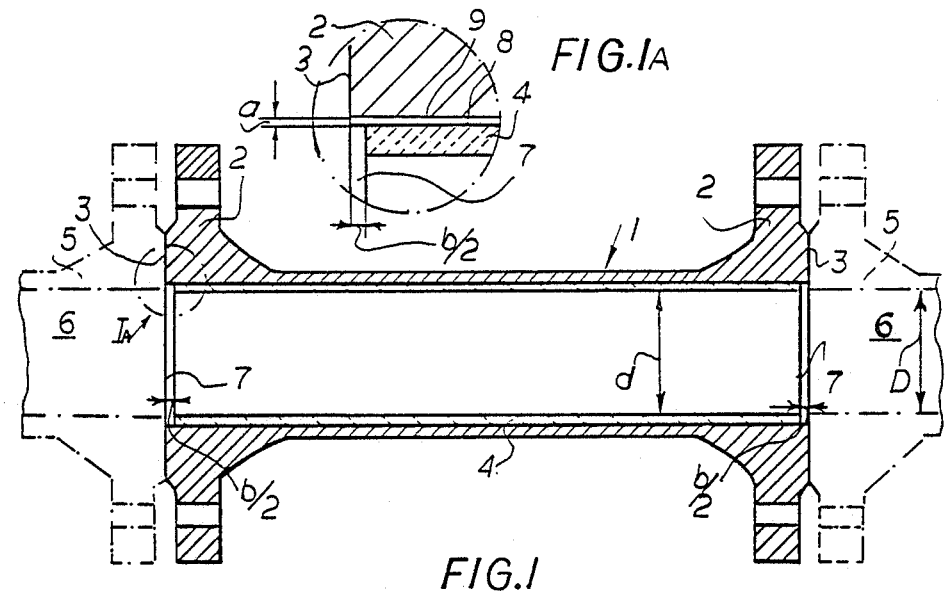
FIG.1A
FIG.1
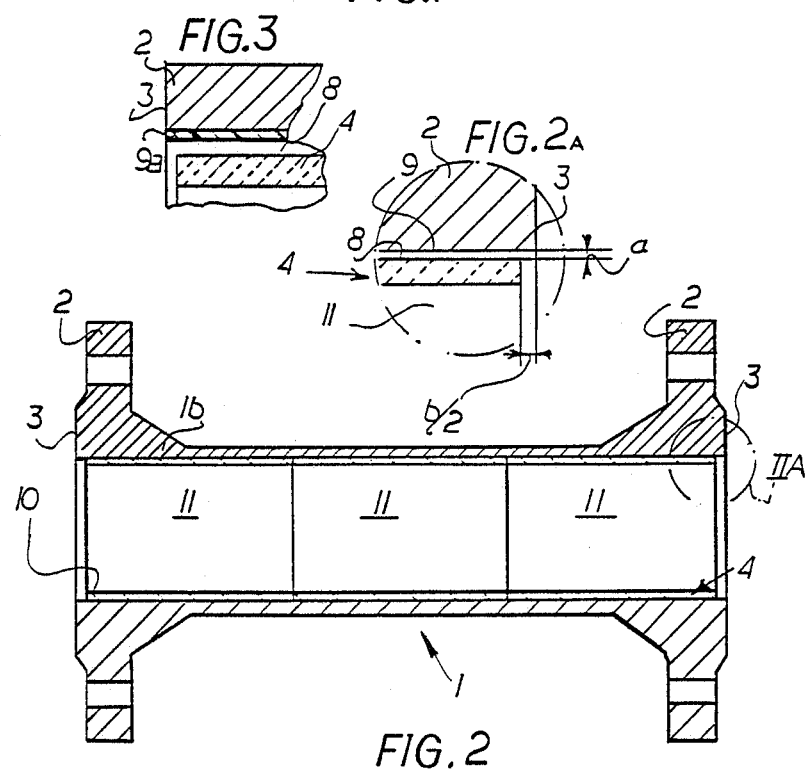
FIG.3
FIG.2A
FIG.2

CONNECTOR PIPE SEGMENT

FIELD OF THE INVENTION

Our present invention relates to a connector pipe segment for a pipe or duct used for a gaseous and fluid flow medium.

BACKGROUND OF THE INVENTION

A conventional connector pipe segment for pipes, ducts or conduits for gaseous as well as fluid flow media usually has a pressure-tight outer shell, at least two connector pieces, a pair and face sealing surfaces and a wear-resistant sleeve, advantageously of a sintered ceramic material.

The wear-resistant sleeve is inserted in the outer shell.

By "connector pipe segment" in regard to this invention we mean a short piece of pipe which is used in a pipe or duct at a place where stresses and strains because of abrasion or erosion occur.

Particularly this place is located where there is an increased flow speed downstream of a constricted or restricted location as occurs for example where there is a diaphragm or flow-constricting aperture or regulating valves or fittings.

The connector pipe segment can be a piece of pipe with a constant diameter or a reducing piece. Also different shaped pieces, particularly bent pipe segments and distributor segments, which likewise are liable to experience high wear are included.

In the known connector pipe segment, the outer shell is rigidly connected with the wear-resistant sleeve. The faces of the wear-resistant sleeve and the outer shell are flush with each other. The end faces of the wear-resistant sleeve are simultaneously sealing surfaces. This arrangement is not free of disadvantages. The bending moments or flexure moments and the torques originating in the adjacent conductor pipe are transferred to the adjacent wear-resistant sleeve. That is also true for pressure impact or hammer, especially steam impact or hammer.

The thermal expansion coefficients of the outer shell which is usually composed of a metallic material and the sintered ceramic wear-resistant sleeve are generally different.

With incorrect mounting and for certain instantaneous operating conditions and operating disturbances, the pulling and pressing forces generated can cause the wear-resistant sleeve to break and fall out of the pipe.

As a result the reliability of the known wear-resistant connector pipe segment is in need of improvement.

OBJECTS OF THE INVENTION

It is an object of our invention to provide an improved connector pipe segment which eliminates these drawbacks.

It is also an object of our invention to provide an improved connector pipe segment which is wear-resistant.

It is another object of our invention to provide an improved wear-resistant connector pipe segment which can take the pressure impact of the flow medium and the bending moments and torques from an adjacent conductor pipe.

SUMMARY OF THE INVENTION

These objects and others which will become more readily apparent hereinafter are attained in accordance with our invention in a connector pipe segment for conductor pipes or conduits for gaseous as well as fluid flow media comprising a pressure-tight outer shell, at least two connector pieces (e.g. pipe connectors such as flange fittings), a plurality of end-face sealing surfaces and a wear-resistant sleeve, advantageously made of a sintered ceramic material.

According to our invention the sealing end-faces are provided exclusively on the outer shell and the wear-resistant sleeve is inserted with radial play and with axial play free of force in the outer shell so that a gap is formed between the outer shell and the wear-resistant sleeve.

This gap is connected with the open cross section of the wear-resistant sleeve and admits the flow medium.

In our invention, therefore, the wear-resistant sleeve is inserted loosely in the outer shell and is positioned balanced in the outer shell. Because of the force free arrangement with axial and radial play, torque and bending moments originating in the adjacent conductor pipe are taken by the outer shell and not transmitted to the sintered ceramic wear sleeve.

Because of the pressure unloading by the gap between the outer shell and the wear-resistant sleeve admitting the flow medium pressure impact in the flow medium leads to no increase in the pressure acting on the wear sleeve. The connector pipe segment according to our invention is thus formed so that the sintered ceramic wear sleeve is exposed only to wear effects. The outer shell takes over the anticorrosion function and absorbs the tension and pressure forces.

The materials for the outer shell are selected in keeping with the corrosion resistance and strength. Plastic however can be used in our invention. In the standard case however the outer shell is metallic.

However it is not necessary to select expensive steel alloys which are corrosion resistant and simultaneously wear-resistant.

In an advantageous example of our invention the outer shell has a pressure-tight metallic connector body which is provided on the inside with a corrosion resistant layer. Because of the wear protection by the wear-resistant sleeve soft and nonabrasive layers are usable. Particularly PTFE (polytetrafluoroethylene) is usable as a layer material.

For extremely corrosive cases a outer shell made from titanium or a titanium alloy can be used. Titanium is a soft material which cannot be used without taking steps to prevent wear when abrasion or erosion is possible. Titanium is characterized by a high corrosion resistance, especially to solutions containing moist chlorine gas and chlorine ions. The connector pipe segment according to our invention in a case where a titanium or titanium alloy outer shell is used has a high corrosion resistance and wear resistance (the latter owing to the ceramic liner loosely received in the shell). It is usable in the chemical industry in special cases with conductor pipes for chlorine, acetaldehyde, nitric acid, fertilizers, soda and plastic material. Because of the resistance to chlorite, hypochlorite and carbon dioxide the connector pipe segment according to our invention is also usable in numerous plants in the textile, cellulose, synthetic fiber and paper industries. It can also be used in desalinization plants.

The radial play between the outer shell and the wear-resistant sleeve is set up so that the wear-resistant sleeve is free of applied forces and balanced in the outer shell (i.e. the pressure is the same along the interior and exterior of the sleeve or linear).

A radial play between the outer shell and the wear-resistant sleeve of more than 0.10 mm is especially suitable.

In some forms of the connector pipe segment of our invention the outer shell has a contacting surface for the wear-resistant sleeve. The wear-resistant sleeve is made as a single piece in the standard case.

In connector pipe segments of greater length however it is advantageous to construct the wear-resistant sleeve from a plurality of wear-resistant rings positioned side-by-side.

In long connector pipe segments with the wear-resistant sleeve formed from a plurality of wear-resistant rings the deformation of the outer shell under bending moments and torques is guaranteed not to be transmitted to the wear-resistant sleeve.

It is understood that alignment errors in pipe guidance can be compensated for in the example with a plurality of wear-resistant rings located side-by-side.

The key advantages of our invention include that the connector pipe segment is not sensitive to flexure moments and torques which occur in the adjacent conductor pipe as well as to the pressure impact in the flow medium. In combination with a sheathing pipe of high corrosion resistance, particularly with a outer shell made from titanium or a titanium alloy, the connector pipe segment according to our invention is characterized not only by a very good wear resistance but also simultaneously by a very high corrosion resistance. Particularly it can be used in a conductor pipe in which a solution containing moist chlorine gas or chlorine-containing solution is fed.

The advantageous properties of the connector pipe segment according to our invention are realized both in short pipe segments and also in fittings of a larger length. By use of wear-resistant rings of normal length connector pipe segments of an arbitrarily large length are economically constructed. Not the least of these advantages is the fact that the sintered ceramic wear-resistant sleeve is easily replaced.

BRIEF DESCRIPTION OF THE DRAWING

The above and other objects, features and advantages of our invention will become more readily apparent from the following description, reference being made to the accompanying highly diagrammatic drawing in which:

FIG. 1 is a longitudinal cross sectional view through a connector pipe segment according to the invention;

FIG. 1a is a detail of the region IA of FIG. 1;

FIG. 2 is a longitudinal cross sectional view through another example of a connector pipe segment according to our invention;

FIG. 2a is a detail of the region of IIA of FIG. 2; and

FIG. 3 is a view similar to FIG. IA showing a linking for the outer shell.

SPECIFIC DESCRIPTION

The connector pipe segment shown in the drawing is suitable for conductor pipes or conduits used for conducting gaseous and fluid flow media.

The connector pipe segment is used in places at which because of a high flow speed special stresses and strains occur because of abrasion or erosion. It can be used as a wear-resistant pipe segment downstream of a constricted or throttled location as occurs for example in blending or regulating valves or fittings.

The basic structure of the connector pipe segment shown in FIGS. 1 and 2 comprises a pressure-tight outer shell 1, connector pieces in the form of pipe connector flanges 2, sealing surfaces 3 at the end faces and a wear-resistant sleeve 4 made from a sintered ceramic material.

The sealing surfaces 3 are located only on the outer shell 1 which is resistant to bending.

The wear-resistant sleeve 4 is inserted free of applied force in the outer shell 1 with radial play a (See FIG. IA), advantageously more than 0.1 mm, and with axial play b. In FIG. IA the half axial play, b/2, of the loose wear-resistant sleeve 4 inserted in the outer shell 1 is illustrated on both ends of the fitting.

In FIG. 1 the flange 5 of the adjacent conductor pipe 6 is indicated with dot-dash lines. The diameter d for the inner open cross section of the wear-resistant sleeve 4 corresponds to the nominal inner diameter D of the conductor pipe 6.

The flange 5 of the conductor pipe 6 provides an abstract surface for the wear-resistant sleeve 4, especially the sealing surfaces, and secures the wear-resistant sleeve 4 against axial sliding.

From FIG. 1 it can be seen that the axial play b of the wear-resistant sleeve 4 inserted loosely in the outer shell 1 defines planes of separation 7.

Because of the radial play a gap 8 forms between the outer shell 1 and the wear-resistant sleeve 4. This gap 8 is connected with the open cross section of the wear-resistant sleeve 4 by the planes of separation 7 and hence can be acted on by the flow medium. FIG. 1 thus shows that the wear-resistant sleeve 4 is positioned free of forces and balanced in the outer shell 1.

The outer shell 1 is acted on by the flow medium. It must be corrosion resistant. In the embodiment of FIG. 3 the outer shell 1 is a pressure-tight metallic connector body which is provided on the inner surface 9 with a corrosion resistant layer of polytetrafluorothylene. In special cases, particularly when the flow medium comprises a solution containing wet chlorine gas or chlorine ions, the outer shell 1 is composed of titanium or a titanium alloy.

As in FIG. 2 the outer shell 1 has a contacting surface 10 for the wear-resistant sleeve 4 on the downstream side. The wear-resistant sleeve 4 itself comprises a plurality of wear-resistant rings 11 positioned side-by-side which each have an appropriate standard length. The example shown in FIG. 2 is recommended as a connector pipe segment for large structural lengths particularly. The contacting surface 10 allows easy mounting. By the plurality of loose wear-resistant rings 11 mounted side-by-side it is guaranteed that deformation of the outer shell 1 because of high flexure moments in the conductor pipe 6 is not transferred to the sintered ceramic wear-resistant sleeve 4.

We claim:

1. In a connector pipe segment for conductor pipes or conduits for gaseous as well as fluid flow media comprising a pressure-tight outer shell, at least two connector pieces, a plurality of end face sealing surfaces and a wear-resistant sleeve, said wear-resistant sleeve being inserted in said outer shell, the improvement wherein said sealing surfaces are located only on said outer shell and said wear-resistant sleeve is inserted with radial play and with axial play free of force in said outer shell so that a gap is formed between said outer shell and said wear-resistant sleeve, said gap being connected with the open cross section of said wear-resistant sleeve and admitting said flow media, said outer shell being a pressure-tight metal connector body which is provided on an inner surface with a corrosion resistant layer.

2. The improvement defined in claim 1 wherein said outer shell is composed of titanium or a titanium alloy.

3. The improvement defined in claim 1 wherein said wear-resistant sleeve is made of a sintered ceramic material and said radial play between said outer shell and said wear-resistant sleeve amounts to more than 0.10 mm.

4. The improvement defined in claim 1 wherein said wear-resistant sleeve is made of a sintered ceramic material.

* * * * *